United States Patent

[11] 3,588,025

[72] Inventor Jerome Gersman
Bronx, N.Y.
[21] Appl. No. 3,411
[22] Filed Jan. 16, 1970
[45] Patented June 28, 1971
[73] Assignee The United States of America as represented by the Secretary of the Navy

[54] OPTICALLY ALIGNABLE BENCH MARK
5 Claims, 2 Drawing Figs.
[52] U.S. Cl. .................................................. 248/481,
248/180, 248/181, 287/12, 287/21
[51] Int. Cl. ........................................................ A47g 1/24,
F16c 11/06
[50] Field of Search .......................................... 248/180,
181, 182, 346, 474, 481; 287/12, 21

[56] References Cited
UNITED STATES PATENTS
973,558   10/1910   Pierce .......................... 287/12X
2,433,594  12/1947  Calo ............................. 287/12X
2,497,933   2/1950   Devers ......................... 248/181UX
3,368,781   2/1968   Altoz............................ 248/481

Primary Examiner—William H. Schultz
Attorneys—Richard S. Sciascia, Louis B. Applebaum and Ernest F. Weinberger ABSTRACT: An optical mirror is supported by the inner member of a spherical bearing whose outer race is in turn supported by a split cylindrical member. A locking ring retainer nut is threaded on the outer surface of the member for tightening the outer member against the inner member, the race surfaces being knurled to provide positive locking therebetween. A boss extending downwardly from the inner member and held in position by four equally spaced adjusting screws contacts the outer surface of the boss. By movement of these screws, the vertical position of the boss and the bearing (with the mirror) is adjusted about the center.

PATENTED JUN 28 1971

3,588,025

INVENTOR.
JEROME GERSMAN

BY Ernest J Weinberger
Louis B. Appleton
ATTORNEYS

OPTICALLY ALIGNABLE BENCH MARK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to optical bench marks and more particularly pertains to precision adjustable supports for the optical mirror of a bench mark wherein the mirror is independently adjustable in two perpendicular planes while the physical center of the mirror surface retains an absolute fixed spacial position.

2. Description of the Prior Art

In the field of adjustable optical bench marks it has been the general practice to support the optical element by four separate butting screws on the bearing surfaces of the element, relying on frictional engagement for rigidity. Further, each screw is individually adjusted so that the element center is displaced for each adjustment and readjustment or compensation is required until the central position thereof is reestablished. Additionally, the reliance on frictional forces results in displacement due to vibration and shock. Such devices have proved unsatisfactory in that they necessitate periodic compensation and are initially time consuming.

SUMMARY OF THE INVENTION

The general purpose of this invention is to provide an adjustable stable optical bench mark that has all the advantages of similarly employed prior art devices and has none of the above-described disadvantages. To attain this, the present invention provides a ringlike spherical bearing inner member having a convex bearing face and an outer member having a complementary bearing face whose surfaces have been knurled and whose inner member supports an optical plane mirror. The bearing is supported on a cylindrically extending base whose upper portion is slotted and threaded on the outside. A ring flange nut is threaded thereon so as to force the bearing surfaces into abutting locking relationship, thereby fixing the mirror position. The inner member is provided with a downwardly extending boss which is vertically adjusted by four equally spaced screws abutting thereagainst, whereby the mirror can be adjusted about its center and thereafter locked by the flange nut.

An object of the present invention is to provide an adjustable optical bench mark that can be firmly locked in position.

Another object is to provide a simple, inexpensive, reliable, stable, accurate adjustable bench mark.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
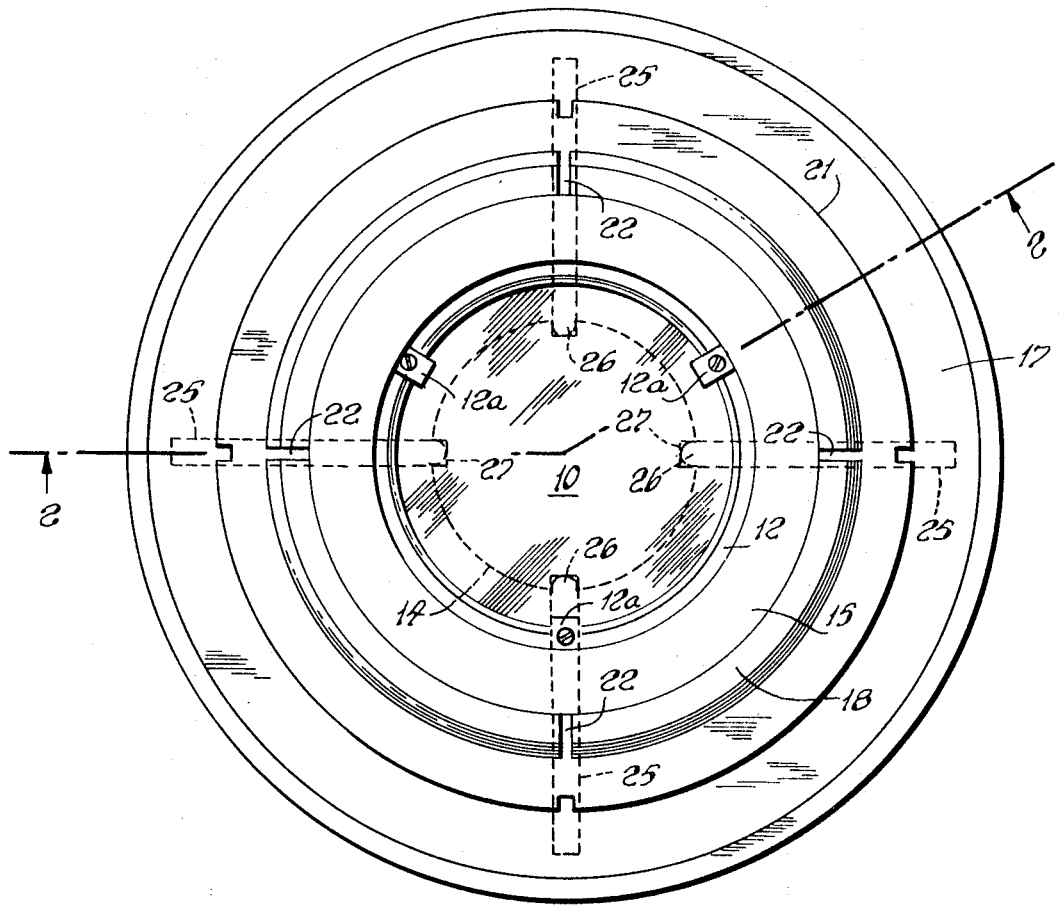
FIG. 1 is a plan view of an embodiment made in accordance with the principle of this invention.
Figure 2:
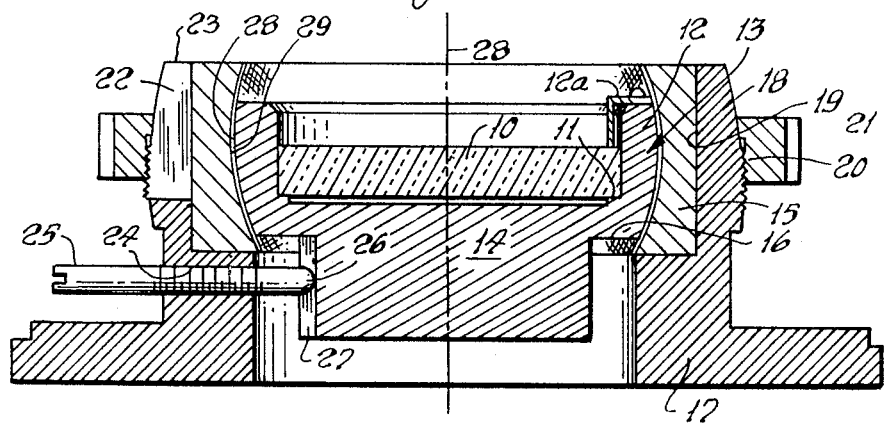
FIG. 2 is a sectional view taken approximately along line 2-2 of FIG. 1

In the illustrated embodiment of FIGS. 1 and 2, an optical flat circular mirror 10 is supported by an inner circular ledge 11 of the inner member 12 of spherical bearing 13. A plurality of spring clips 12a fastened to the upper surface of the member 12 clamp and hold the mirror against the ledge 11. Integral with and depending from the inner member is a cylindrical boss 14 which is directly below the mirror 10. The outer member 15 of bearing 13 is supported vertically by an inwardly directed shoulder 16 provided in the base 17. The base 17 is formed with a generally cylindrical upstanding portion 18 whose inner wall 19 abuts the outer surface of the outer member 15. The outside face of the upstanding portion 18 converges conically upwardly and is circularly threaded as along 20. Mating therewith and disposed thereabout is a circular flange nut 21. The portion 18 is provided with a plurality of vertically slots 22 which extend from the upper end 23 to approximately the horizontal plane of the lower end of the mirror 10. These slots permit the flange nut 21 to tighten against base portion 18 and which in turn can apply a radial force against the outer member 18 clamping the inner member (and the mirror) in a stable, fixed position.

The lower portion of the base 17 has radially therethrough four equally spaced-apart threaded apertures 24 which have disposed each therein a thread mating adjusting screw 25. The operating end 26 of each screw is generally spherical and abuts the surface of boss 14 in a mating vertical recess 27 therein. This allows the boss to pivot around a center line 28 under the action of the adjusting screws since one opposite pair will be adjusted together while the other pair will be held fixed. Thus the boss (and the mirror) will be made to pivot first in one plane and then in a perpendicular plane without any cross-planar movement. In order to assure positive action and locking of the optical mirror in the bench mark the coacting member or bearing surfaces 29 and 30 can be slightly abraded or knurled.

Summarizing the overall operation of adjusting the mirror, the flange ring nut 21 is loosened so as to permit relative movement of the bearing surfaces. Then, by inwardly moving one adjusting screw while the opposite screw is outwardly directed the mirror is adjusted in one plane. The opposite pair of screws are similarly adjusted for the other plane. After these adjustments are made flange nut 21 is tightened so that everything is locked in position.

Obviously many modifications and variations of the present invention are possible in the light of the above teachings. It is therefore to be understood that within the scope of the appended claims the invention may be practiced otherwise than as specifically described.

I claim:

1. An optical bench mark assembly for adjustably positioning a plane mirror supported thereby, which comprises:

a spherical circular bearing having an inner member having a convex bearing face and an outer member having a complementary bearing face, said inner member being provided with means for supporting said mirror therein, and having a depending boss disposed below said mirror, a base member having an upstanding hollow cylindrical portion and being formed with an internal circumferential lateral shoulder, said upstanding portion being provided with vertical slots and having its outer surface threaded, said bearing being disposed within said upstanding portion and supported on said lateral shoulder with said outer member abutting the inner wall of said upstanding portion, a flange nut threaded on said upstanding portion for tightening said portion against said outer member, and adjusting means for positioning said inner member and said mirror.

2. The assembly according to claim 1 wherein said adjusting means are four equally spaced radially directed screws threaded in said base and having their operating end portions abutting said boss, whereby said boss and said mirror can be positioned by opposite pairs of said screws and said assembly thereafter locked in position by said flange nut.

3. The assembly according to claim 2 wherein said operating end portions of said screws are spherically shaped and said boss is provided with vertical recesses mating with said operating ends.

4. The assembly according to claim 3 wherein said outer surface of said upstanding portion is upwardly converging.

5. The assembly according to claim 4 further including spring clips carried by said inner member and contacting said mirror for holding said mirror against said inner member.